(12) United States Patent
Rupp et al.

(10) Patent No.: US 12,250,954 B2
(45) Date of Patent: *Mar. 18, 2025

(54) ICE BLOCK FORM

(71) Applicant: Snowie LLC, Salt Lake City, UT (US)

(72) Inventors: Carl Rupp, Salt Lake City, UT (US); Gregg Gehring, West Valley City, UT (US)

(73) Assignee: Snowie LLC, Salt Lake City, UT (US)

( * ) Notice: Subject to any disclaimer, the term of this patent is extended or adjusted under 35 U.S.C. 154(b) by 483 days.

This patent is subject to a terminal disclaimer.

(21) Appl. No.: 17/660,495

(22) Filed: Apr. 25, 2022

(65) Prior Publication Data
US 2022/0394995 A1 Dec. 15, 2022

Related U.S. Application Data

(63) Continuation of application No. 16/033,145, filed on Jul. 11, 2018, now Pat. No. 11,311,025.

(60) Provisional application No. 62/531,311, filed on Jul. 11, 2017.

(51) Int. Cl.
*A23G 9/22* (2006.01)
*A23G 9/08* (2006.01)

(52) U.S. Cl.
CPC ............. *A23G 9/083* (2013.01); *A23G 9/221* (2013.01)

(58) Field of Classification Search
CPC ................................ A23G 9/083; A23G 9/221
See application file for complete search history.

(56) References Cited

U.S. PATENT DOCUMENTS

| | | |
|---|---|---|
| 1,936,814 A | 11/1933 | Wette, Sr. |
| 2,260,450 A | 10/1941 | Guinane |
| 3,684,234 A | 8/1972 | Clinebell |
| 3,816,048 A | 6/1974 | Berry et al. |
| 4,111,329 A | 9/1978 | Lampman |
| 4,117,946 A | 10/1978 | Kessler |
| 4,356,930 A | 11/1982 | Roper |
| 4,498,595 A | 2/1985 | Wilson |
| 4,601,174 A | 7/1986 | Wilson |
| 5,775,483 A | 7/1998 | Lown et al. |
| 6,279,788 B1 | 8/2001 | Lillelund et al. |
| 6,298,994 B1 | 10/2001 | Debrunner et al. |
| 11,311,025 B2 | 4/2022 | Rupp et al. |
| 2002/0031586 A1 | 3/2002 | Wybor |
| 2007/0262230 A1* | 11/2007 | McDermott ............. F25C 1/22 249/126 |

* cited by examiner

*Primary Examiner* — James Sanders
(74) *Attorney, Agent, or Firm* — TechLaw Ventures, PLLC; Terrence J. Edwards (57) ABSTRACT

The present disclosure extends to apparatuses, methods, and systems for freezing a liquid suitable for use by a frozen confection machine. The apparatuses, methods, and systems include a two-piece form suitable for producing a dense ice structure.

19 Claims, 13 Drawing Sheets

ICE BLOCK FORM

CROSS-REFERENCE TO RELATED APPLICATION

This application is a continuation of U.S. patent application Ser. No. 16/033,145, filed Jul. 11, 2018, entitled "ICE BLOCK FORM," (now U.S. Pat. No. 11,311,025, issued Apr. 26, 2022) which claims the benefit of U.S. Provisional Application No. 62/531,311, filed Jul. 11, 2017, which is incorporated herein by reference in its entirety, including but not limited to those portions that specifically appear hereinafter, the incorporation by reference being made with the following exception: In the event that any portion of the above-referenced application is inconsistent with this application, this application supersedes said above-referenced application.

BACKGROUND

Frozen confections such as snow cones and shaved ice have become increasingly popular and the need to produce ice suitable for frozen confections has increased. Machines for conditioning the ice used in frozen confections may be produced to accommodate an ice block of a particular size. What is needed are systems and methods for efficiently producing ice that is structurally sound and configured to be used by a frozen confection machine.

Many systems and attempts to produce structurally sound and appropriately sized ice blocks use extruders or elaborate freezing systems that require dedicated space rather than a simple commercial freezer unit. U.S. Pat. No. 3,684,234 to Clinebell, issued Aug. 15, 1972, the disclosure of which is incorporated by reference herein in its entirety, represents one attempt to provide a form for making an ice block in in a home freezer, which has flexible side walls held in place by bands and bolts and a lid that secures to hold a bag placed in the form closed to define a dead air space at the top of the bag and between the bag and sidewall sections and is intended to be disassembled for storage. Such forms are formed from multiple small pieces made of increasing the likelihood of mis-assembly and lost components.

A system that provided ice block forms of a simple one-piece construction that allowed for expansion during freezing of the block and facilitated removal while reducing the cost and number of components of the form would be an improvement in the art. Such a system that allowed for stacking in a manner that facilitated freezing of multiple blocks in a single freezer while providing ice blocks that are structurally sound and configured to be used by a frozen confection machine would be a further improvement in the art.

SUMMARY

The present disclosure extends to apparatuses, methods, and systems for freezing a liquid suitable for use by a frozen confection machine. The apparatuses, methods, and systems include forms suitable for producing a dense ice structure.

In one illustrative embodiment, an ice block form has a base forming a floor and sidewalls that rise to an open top. One or more expansion joints may be formed as slits or gaps between the sidewalls at corners of the form. One or more flanges may be disposed at an upper edge of the sidewalls. In some embodiments, a stacking member formed as a generally planar member with an elevation structures disposed on a first surface and retaining structures on the opposite surface may be used to cover the open top of a first ice block form to define an insulative space above water in the first form for producing dense ice structure, while also supporting the base of a second ice block form above the first form, allowing stacking of the forms with a space therebetween for movement of air in freezer for efficient freezing of multiple blocks.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

The present disclosure extends to apparatuses, methods, and systems for freezing a liquid and conditioning ice in a form suitable for producing frozen confections. More specifically, the disclosure extends to forms for efficiently freezing water in a shape suitable for a frozen confection machine such that the ice is suitably strong for producing shaved ice. The features and advantages of the disclosure will be set forth in the description which follows, and in part will be apparent from the description, or may be learned by the practice of the disclosure without undue experimentation. The features and advantages of the disclosure may be realized and obtained by means of the instruments and combinations particularly pointed out in the appended claims.

For the purposes of promoting an understanding of the principles in accordance with the disclosure, reference will now be made to the embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the structure, systems and methods for producing ice are disclosed and described, it is to be understood that this disclosure is not limited to the particular structures, configurations, process steps, and materials disclosed herein as such structures, configurations, process steps, and materials may vary somewhat. It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

Figure 1:
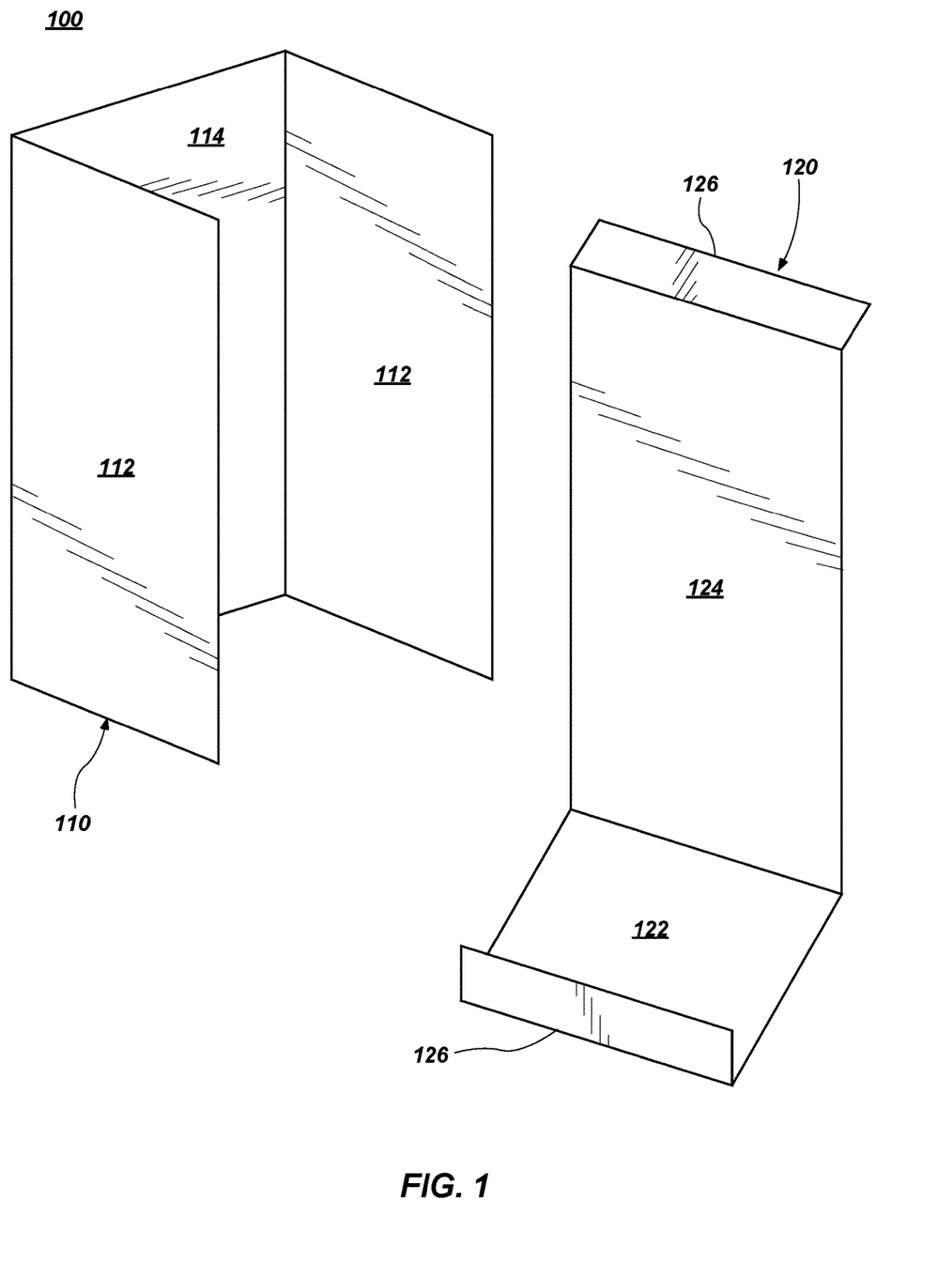
FIG. 1 illustrates an exploded perspective view of an ice form in accordance with the technologies and features of the disclosure.

Referring now to the figures, FIG. 1 illustrates an exploded perspective view of a form 100 for producing ice. The form 100 includes a structure component 110 and a base component 120. The structure component 110 includes two structural sides 112 and a structural back 114, each configured to surround a bag filled with a liquid. The base component 120 includes a base 122 and a side 124. Each of the base 122 and the side 124 includes a lip 126. The base component 120 is configured to slide into the structure component 110 such that the base 122, side 124, the structure sides 112, and the back portion 114 form an enclosed space. The base 122 forms a base for the complete structure.

The form 100 is configured to hold a bag comprising a liquid for an extended period as the liquid is frozen. The sides 112, 114, 124 of the form comprise four sides surrounding the bag comprising a liquid. The sides and the base 122 form the structure of the frozen liquid.

In an implementation, the sides 112, 114 have a height from about 15 inches to about 25 inches. In an implementation, the sides 112, 114 have a height of 19 inches. In an implementation, the side of the base component has a height from about 15 inches to about 25 inches, and may particularly have a height of about 19 inches. In an implementation, the lip 126 extends out from either of the base 122 or the side 124 a distance from about 1 inch to about 2 inches, and may particularly extend a distance of about 1 1/16 inches. In an implementation, the base 122 is a square having a side length from about 5 inches to about 10 inches, and may particularly have a side length of about 6.5 inches. In an implementation, the base 122 is a rectangle.

In an implementation, the area formed by the sides 112 and back 114 of the structural component 110 is smaller than the area of the base 122. In such an implementation, the structural component may slide into the base component 120. The back 114 of the structural component 110 may be situated against the lip 126 attached to the base 122.

Figure 2:
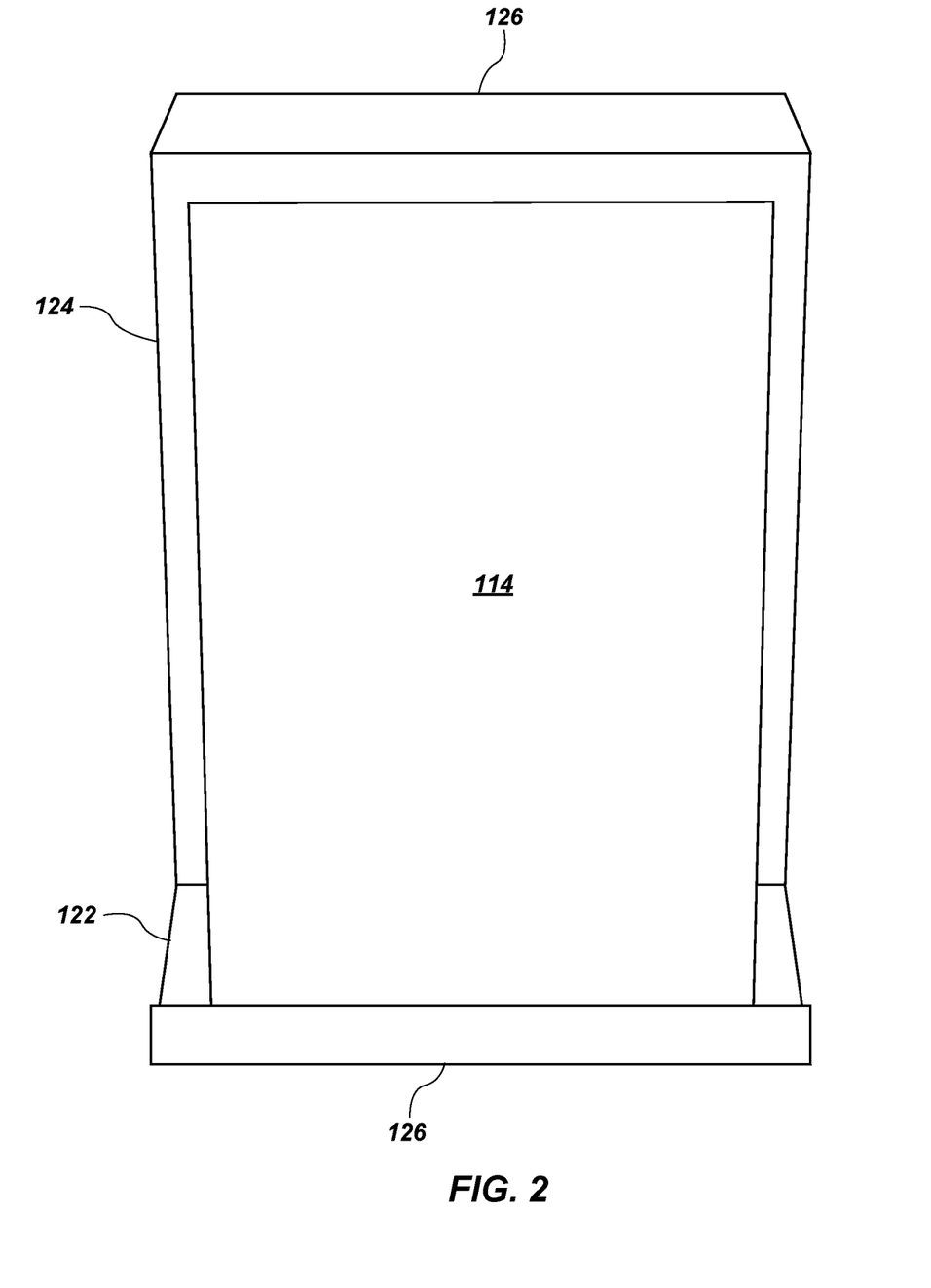
FIG. 2 illustrates a front view of an ice form in accordance with the technologies and features of the disclosure.

FIG. 2 illustrates a generally front view of a form for producing ice. The form includes a structural back 114 attached to a structure component 110. The form includes a side 124 attached to a base component 120. The base component further includes two lips 126, wherein one lip is attached to the side 124 and one lip is attached to the base 122.

Figure 3:
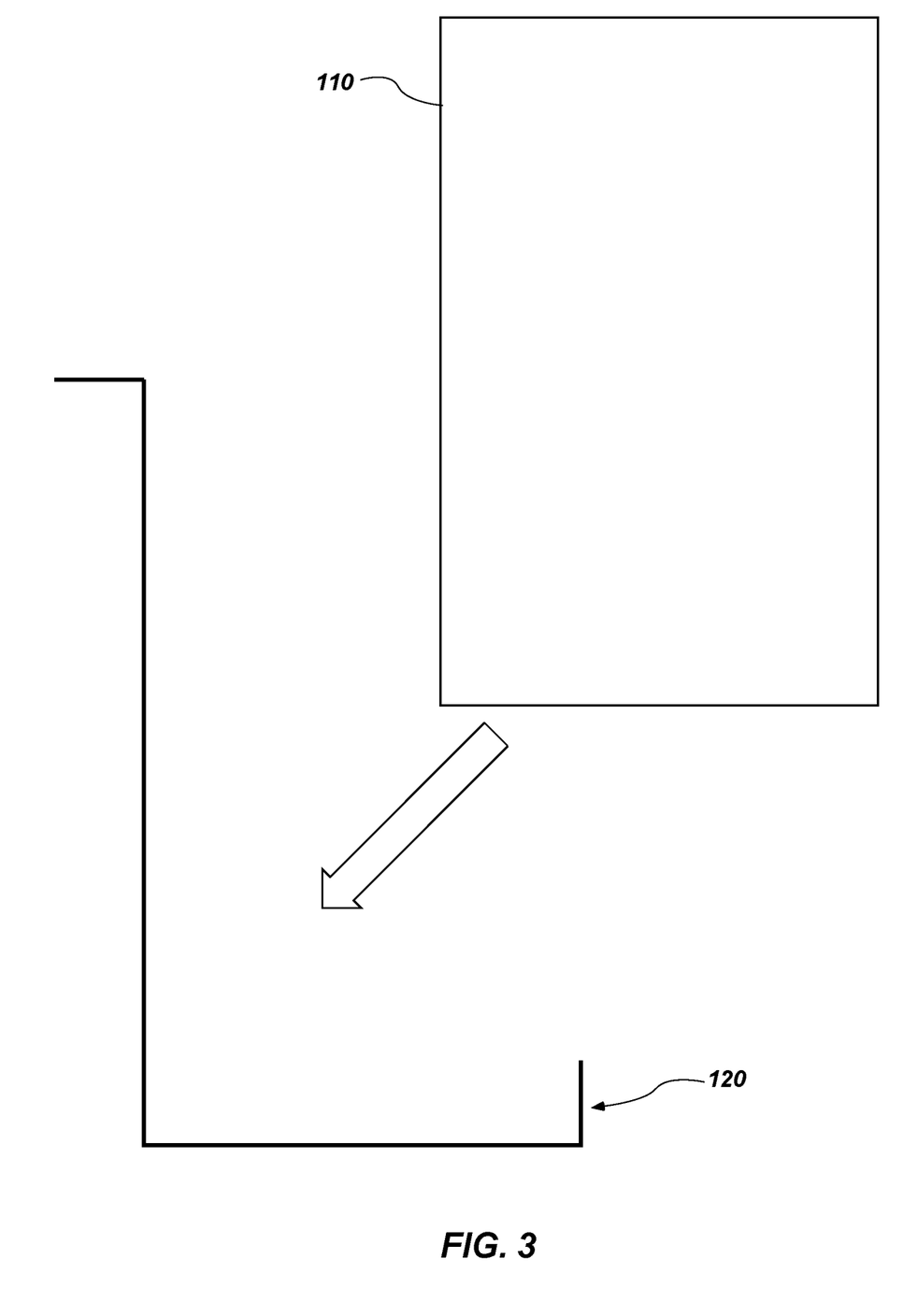
FIG. 3 illustrates an exploded side view of an ice form in accordance with the technologies and features of the disclosure.

FIG. 3 illustrates an exploded side view of a form for producing ice. The form includes a base component 120 and a structural component 110. As illustrated in FIG. 3, the base component 120 and the structural component 110 may fit together such that the structural component and the base component form a five-sided structure. In an implementation, the five-sided structure is placed in a freezing compartment and a bag comprising a liquid is placed within the confines of the five-sided structure. The bag comprising a liquid may then conform to the five-sided structure such that the liquid freezes in a block form. The liquid may then be removed from the bag if desired.

Figure 4:
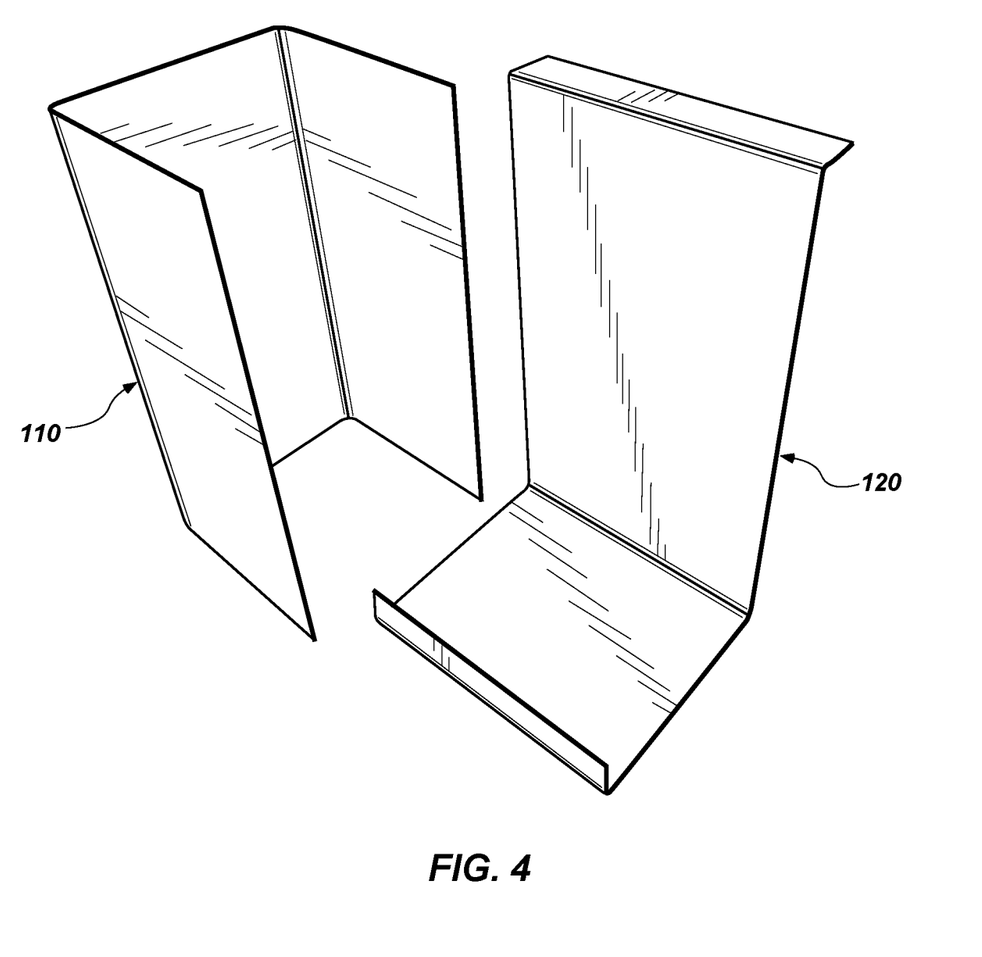
FIG. 4 illustrates an exploded perspective view of an ice form in accordance with the technologies and features of the disclosure.

FIG. 4 illustrates an exploded perspective view of a form for producing ice. The form includes a structural component 110 and a base component 120. As depicted in FIG. 4, the structural component 110 and the base component 120 are formed such that the structural component 110 may slide on to the base component 120. The structural component 110 comprises three sides that may combine with the base and the side of the base component 120 to form a five-sided structure having a base. The base component 120 includes two lips wherein one lip is attached to the base of the base component and one lip is attached to the side of the base component 120.

In an implementation, at least one of the three sides forming the structural component 110 is tapered such that a bottom area formed by the three sides of the structural component 110 is smaller than a top area formed by the three sides of the structural component 110. In an implementation, the side of the base component 120 is angled to form an obtuse angle with respect to the base of the base component. In either of these implementations the form is configured to ensure that a liquid within the confines of the form freezes first on the bottom. Ensuring the liquid freezes first on the bottom can improve the structure of the frozen liquid such that it is less likely to break or crumble under stress.

In an implementation, the side of the base component 120 forms a right angle, or a near-right angle, with the base of the base. In an implementation, the sides are straight and a bottom area formed by the three sides is similar to a top area formed by the three sides.

Figure 5:
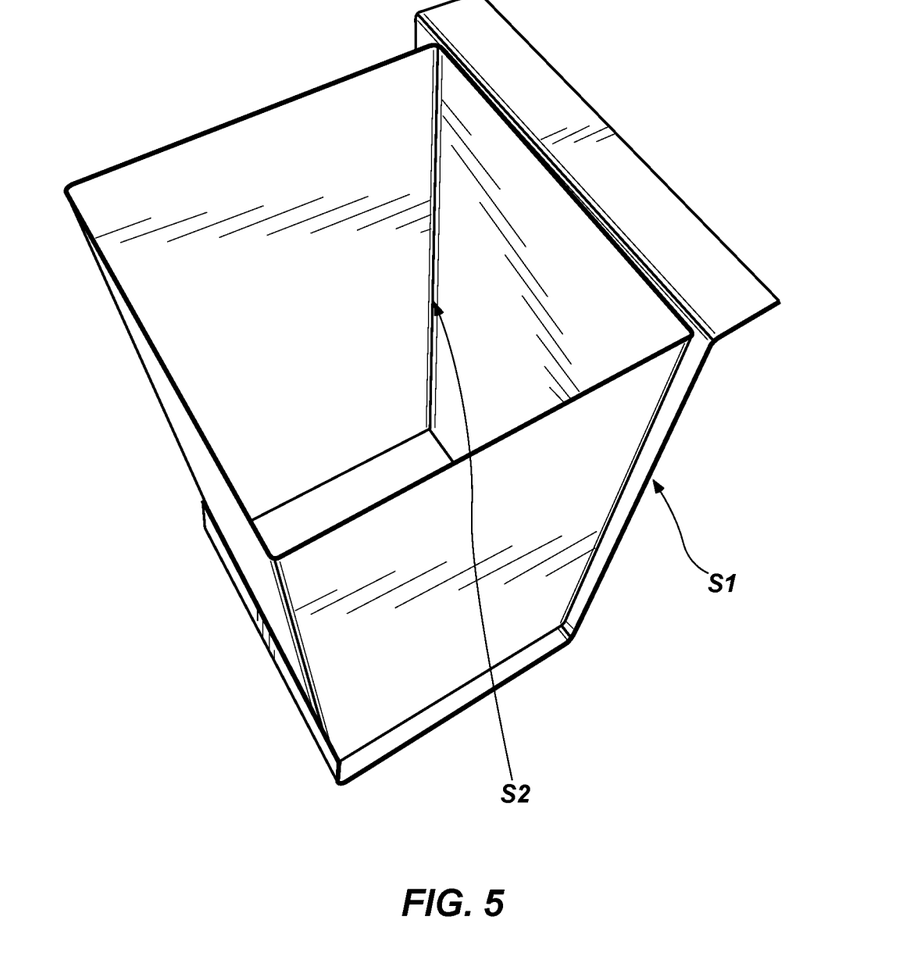
FIG. 5 illustrates an aerial perspective view of an ice form in accordance with the technologies and features of the disclosure.

FIG. 5 illustrates an aerial perspective view of a form for producing ice. As illustrated in FIG. 5, the structural component 110 may slide into the base component 120. The side 124 of the base component 120 may combine with the plurality of sides of the structural component 110 to form a five-sided structure having a base. The base component may include two lips, one lip attached to the base of the base component 120 and one lip attached to the side 124 of the base component 120. The lip attached to the base may extend up an exterior of the structural component 110 and help secure the structural component 110 in place. The lip attached to the side of the base component 120 may extended outward from the form 100. As depicted, two vertical expansion joints S1 and S2 are formed between the plurality of sides and the base component to allow for expansion of the ice during freezing.

Figure 6:
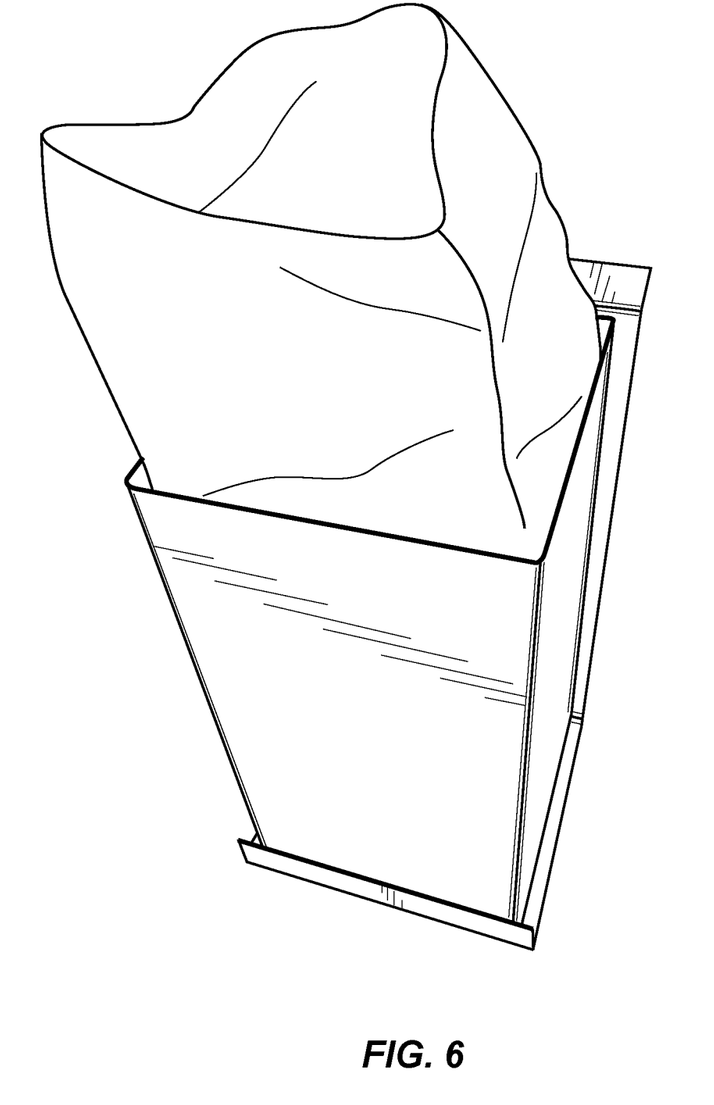
FIG. 6 illustrates an aerial perspective view of an ice form in accordance with the technologies and features of the disclosure.

FIG. 6 illustrates an aerial perspective view of a form for producing ice. As illustrated in FIG. 6, a bag comprising a liquid may be placed within the five-sided form. The form 100 may hold the bag comprising the liquid for an extended period such that the liquid freezes in the same shape as the form.

Figure 7:
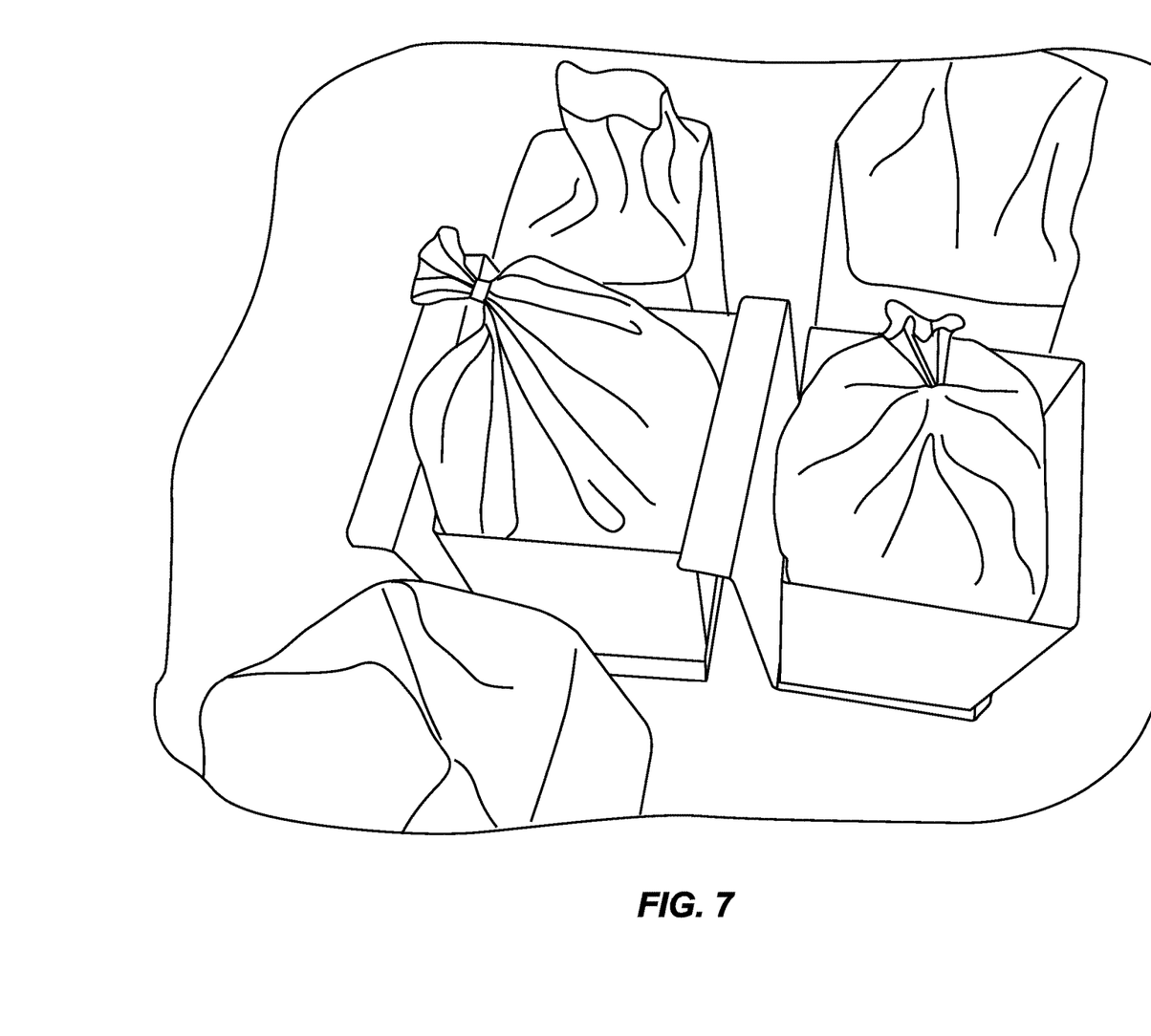
FIG. 7 illustrates an aerial perspective view of a plurality of ice forms in accordance with the technologies and features of the disclosure.

FIG. 7 illustrates an aerial perspective view of a plurality of forms for producing ice located in a freezer. As illustrated in FIG. 7, a bag comprising a liquid may be placed within the five-sided form for an extended period such that the liquid freezes in the same shape as the form. In an implementation, the side 124 of the base component 120 forms an obtuse angle with respect to the base 122 of the base component 120. In an implementation, the three sides 112, 114 of the structural component 110 form right angles or near-right angles with one another. In such an implementation, the obtuse angle formed in the base component 120 ensures that the area of the form located near the base 122 is smaller than an upper area of the form located near the open side. In such an implementation, the form promotes a liquid to freeze near the base 122 before the liquid freezes near the top at the open side. This procedure for freezing a liquid can be important for producing a structurally sound solid that can withstand stress without crumbling or breaking.

Figure 8:
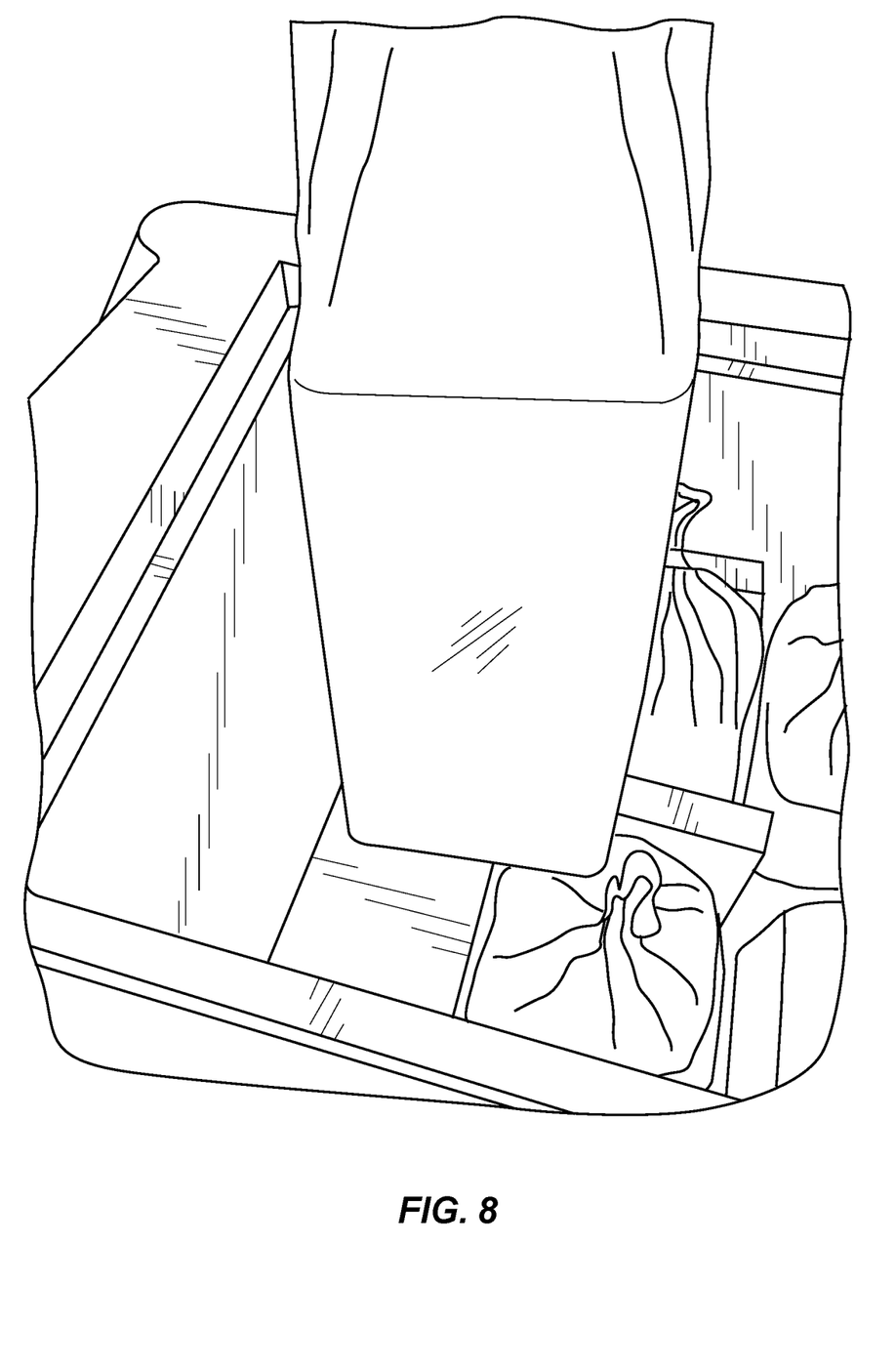
FIG. 8 illustrates an aerial perspective view of a plurality of ice forms in accordance with the technologies and features of the disclosure.

FIG. 8 illustrates an aerial perspective view of a plurality of forms for producing ice located in a freezer, including one fully formed ice block. As illustrated in FIG. 8, a bag comprising a liquid may be placed within the five-sided structure formed by the form 100. The liquid may be permitted to freeze within the confines of the five-sided structure and then a frozen solid may be removed from the form 100. As illustrated in FIG. 8, a bag comprising a frozen solid is being lifted from a five-sided form. The solid within the bag is frozen to the same shape formed by the five-sided form.

In an implementation, the form 100 is constructed of sheet metal. In such an implementation, the structural component 110 and the base component 120 are cut from sheet metal and bent to form the proper structure. The structural component 110 is bent to form three sides. The base component 120 is bent to form a lip, a base, a side, and an additional lip. In such an implementation, a number of forms 100 may be constructed of a single piece of sheet metal and shaped to the correct structure. Further in such an implementation, the form 100 may withstand fluctuations in temperature as the form is placed within a cold environment, such as a sub-zero environment, and placed in a warmer environment such as room temperature. It should be appreciated that the form 100 may be constructed of any suitable material, such as sheet metal, a ceramic, a concrete, a polycarbonate, and so forth.

Turning to FIGS. 9-14, a second illustrative embodiment of an ice block form 1000 in accordance with the disclosure is depicted. Form 100 is generally formed as a box having a floor defined by a bottom or base member 1006, and an open top 1100 defined by sidewalls rising from the bottom 1006. As depicted, form 1000 may be formed as a generally rectangular bock have two opposite sidewalls 1002A and 1002B that are relatively narrower to define first and second ends of the rectangular form and two opposite sidewalls 1004A and 1004B extending therebetween that are relatively wider to define the longer sides of the rectangular form. It will be appreciated that the number of sides and the relative widths thereof may vary based on the intended use of the resulting ice blocks. For example, the depicted embodiment may produce generally rectangular ice blocks having a certain size and shape for use in a block ice shaver for the production of confectionaries. For uses where different shaped blocks (such as tri-agonal, hexagonal, etc.) would be desired, differently shaped forms may be used.

Each sidewall 1002A, 1002B, 1004A, or 1004B is joined to the bottom 1006 and rises therefrom generally perpendicularly. In the depicted embodiment, each sidewall may be disposed at an angle of generally about 90 degrees to the adjacent sidewall. One or more vertical expansion joints S10, S12, S14 and S16 may be disposed at a corner of the form 1000, formed as a slit extending between the respective sidewalls forming that corner and extending from the bottom 1006 to the top of the form 1000. In the depicted embodiment there are four vertical expansion joints, but it will be appreciated that this number may be varied depending on the particular usage of a form 1000.

The vertical expansion joints allow the sidewalls to move with respect to one another, providing flexibility for the expansion of a liquid held in a flexible plastic liner within the form 1000 during freezing. This movement also facilitates removal of an ice block for use. Additionally, the flexibility may allow for multiple forms 1000 to be stacked inside one another for storage when not in use.

Each sidewall 1002A, 1002B, 1004A and 1004B may have a lip or flange 1012A, 1012B, 1014A, or 1014B, respectively extending outwards at a generally perpendicular angle therefrom at the top end thereof. Each flange may extend for a portion or the entire width of its respective sidewall and may have rounded corners. The flanges 1012A, 1012B, 1014A, and 1014B are generally coplanar.

Figure 15:
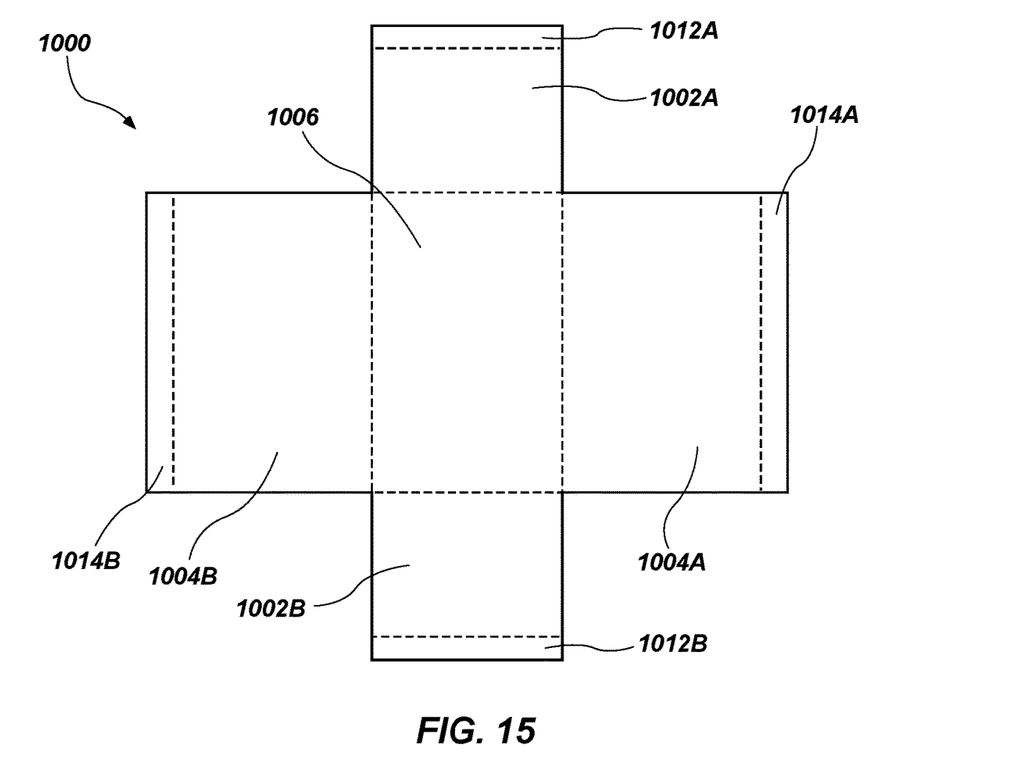
FIG. 15 is a plan view of a blank for forming the ice form of FIGS. 9 through 15.

In an implementation, the form 1000 may be constructed of sheet metal. FIG. 15 depicts a "blank" 1600 cut from an appropriate gauge sheet metal that may be bent to a proper shape to form the proper structure. The location of required bends are indicated by dashed lines. The resulting structures are indicated by corresponding reference numerals. The blank 1600 is bent to form each sidewall and lip or flange. The use of a single piece of sheet metal shaped to the correct structure can ease manufacture and reduce costs. Further in such an implementation, the form 1000 may withstand fluctuations in temperature as the form is placed within a cold environment, such as a sub-zero environment, and placed in a warmer environment such as room temperature. It should be appreciated that in other embodiments, the form 1000 may be constructed of any suitable material, such as sheet metal, a ceramic, a concrete, a polycarbonate, and so forth.

Figure 9:
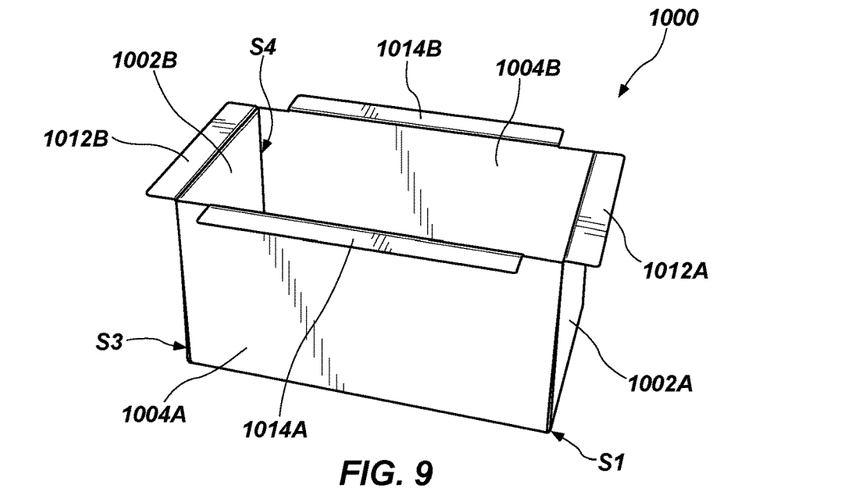
FIG. 9 is a perspective view of another ice form in accordance with the teachings of the present disclosure.
Figure 10:
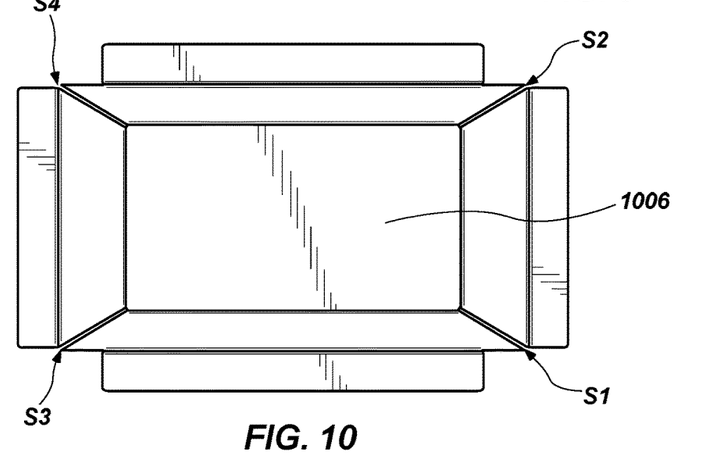
FIGS. 10, 11, 12, 13, and 14 are top side, bottom side, front side, rear side, and right side views, respectively of the ice form of FIG. 9.
Figure 11:
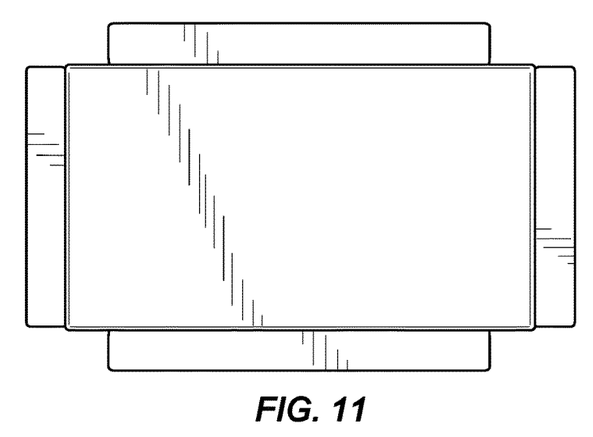
Figure 12:
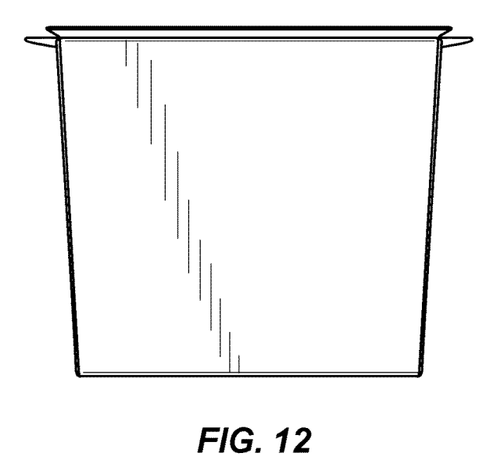
Figure 13:
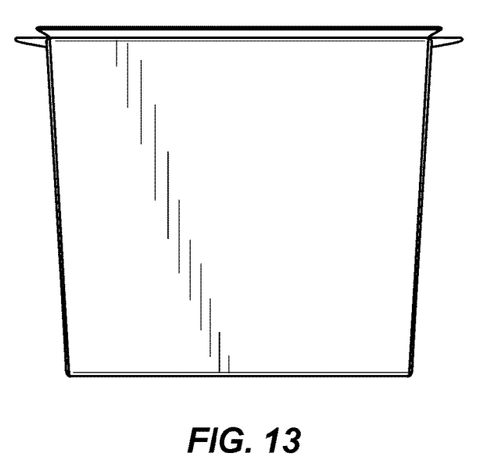
Figure 14:
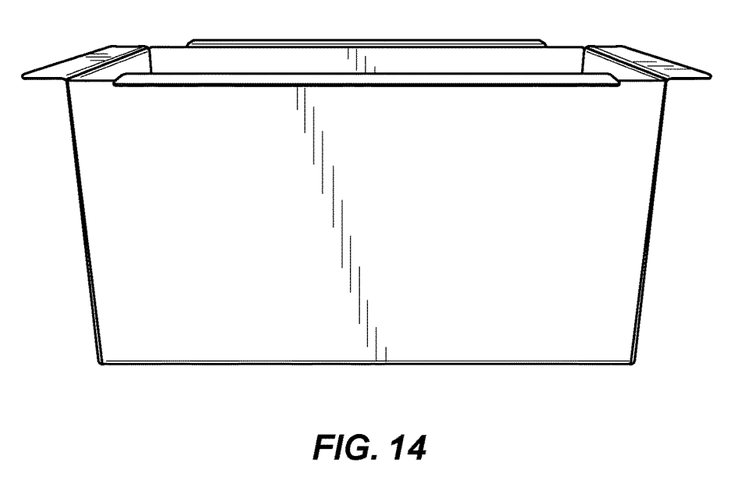

While the dimensions of form 1000 can vary based on the size of the desired frozen block, in one embodiment the form 1000 may have a height and a width of between 3 and 12 inches and a length of between 10 and 25 inches. In one particular implementation, it may have a height and a width of about 6.5 inches and a length of about 19 inches to produce a block for use with an ice block shaver.

Figure 16:
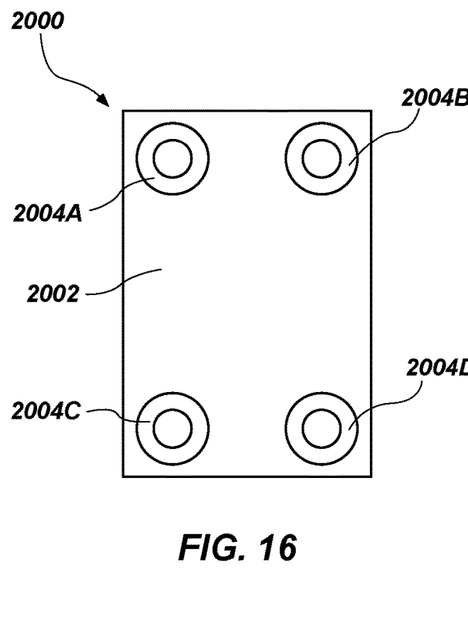
FIGS. 16, 17, and 18 are top, bottom, and side views, respectively of a stacking plate for use with the ice form of FIGS. 9 through 15.
Figure 17:
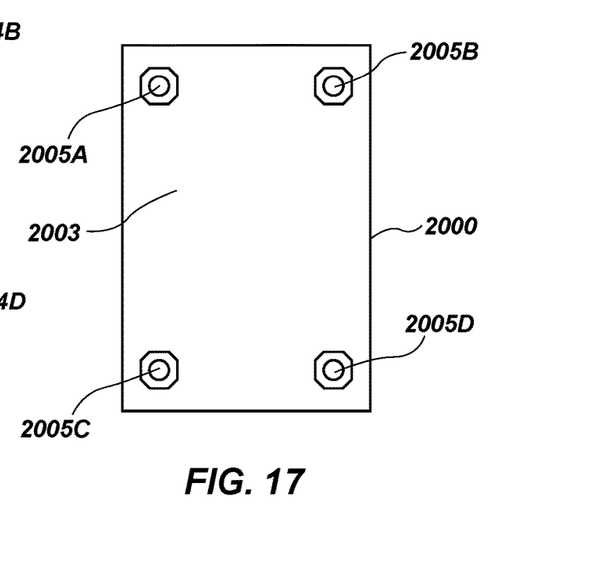
Figure 18:
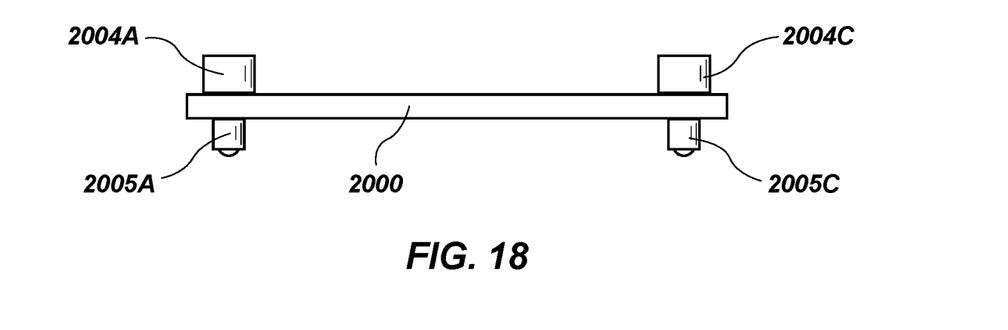

Turning to FIGS. 16 through 18, a stacking member 2000 for use with form 1000 in a system for forming blocks. Stacking member 2000 may be formed as a generally planar body 2001 having a first surface 2002, which is generally flat and may be referred to as an "upper surface" and an opposite second surface 2003, which is generally flat and may be referred to as a "lower surface". Body 2001 may be sized and configured to cover the open top 1100 of an ice block form when placed thereover, with the second surface 2001 placed on the flanges 1012A, 1012B, 1014A and 1014B.

A plurality of elevation structures 2004 may be disposed on the first surface 2002. In the depicted embodiment, there are four elevation structures, 2004A, 2004B, 2004C and 2004D. It will be appreciated that the number of elevation structures may vary depending on the particular embodiment, but needs to be sufficient to support an ice form 1000 that is filled with a liquid above the first surface 2002 while maintaining a sufficient gap therebetween as discussed further herein. In the depicted embodiment, the elevation structures 2004A, 2004B, 2004B, and 2004C may be formed as four columnar bodies attached to the first surface 2002. For example, columnar feet or stops that may be formed from resilient material such as a rubberized columnar bumper attached to the planar body 2001 using a bolt may be used. It will be appreciated that such structures are merely exemplary and any suitable structure may be used.

On the opposite second surface 2003 there may be disposed a plurality of alignment structures 2005. In the depicted embodiment, there may be four alignment structures 2005A, 2005B, 2005C and 2005D. The alignment structures may be structures that extend out from the second surface and are positioned to correspond to the open top 1100 of an ice block form 1000 to be inserted therein and reside near the sidewalls thereof. in the depicted embodiment, there are four alignment structures that will reside near or may even abut, the four corners of an ice block form 1000 upon insertion therein to maintain the stacking plate 2000 in the desired position. In the depicted embodiment, the alignment structures may be formed as caps or acorn nuts placed on the threaded shaft of a bolt retaining the elevation structures. Accordingly, the placement of the alignment structures may correspond to the elevation structures.

Figure 19:
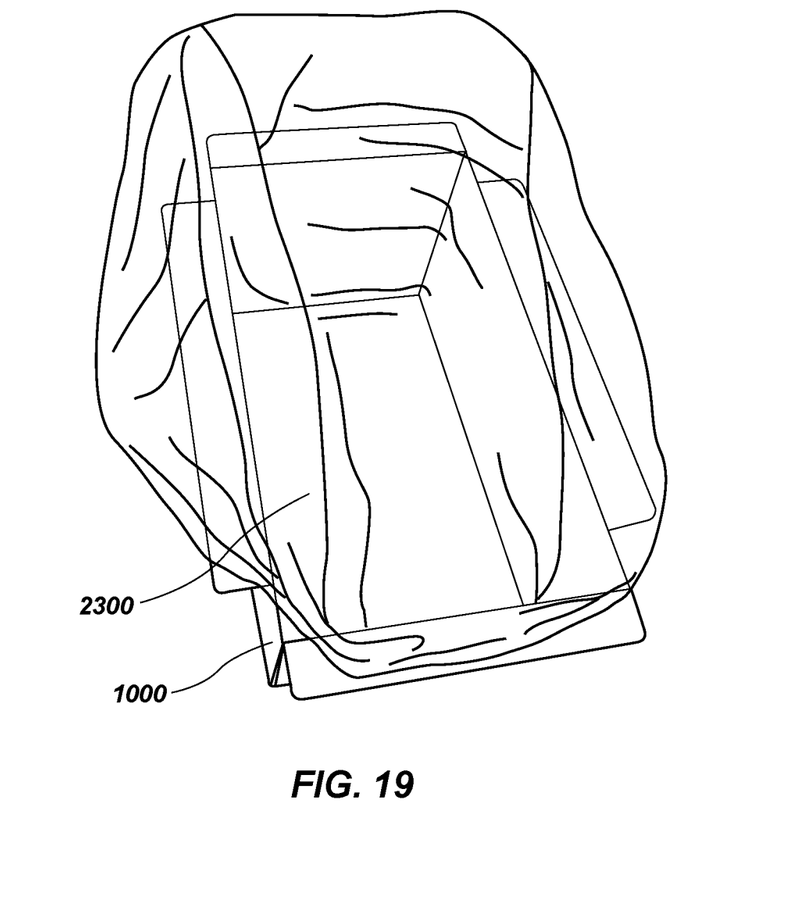
FIG. 19 is a perspective view of an ice block form and a liner for forming and ice block.
Figure 20A:
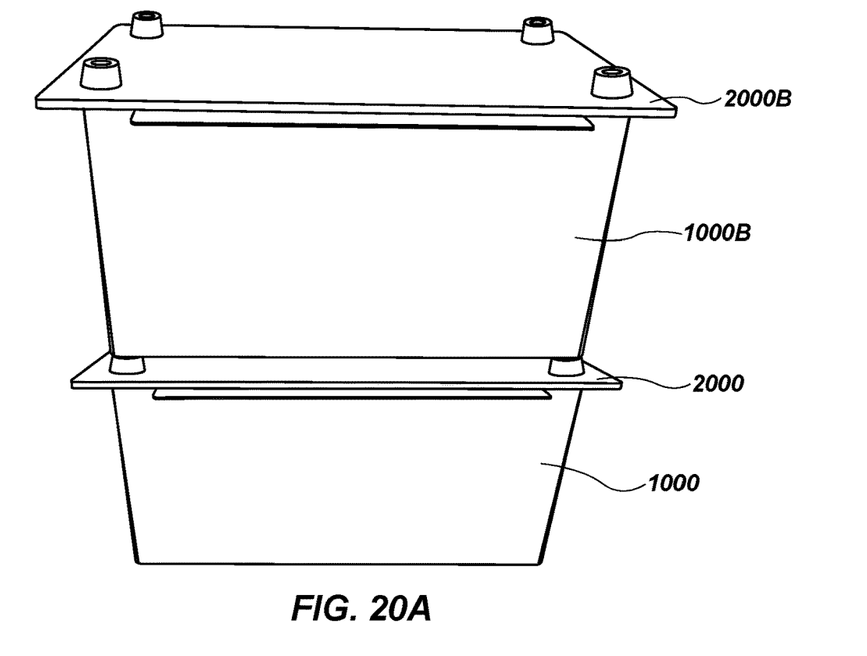
FIGS. 20A and 20B are side and sectional front views of a series of ice forms and stacker plates in accordance with FIGS. 9 through 19 stacked for use in making multiple ice blocks.
Figure 20B:
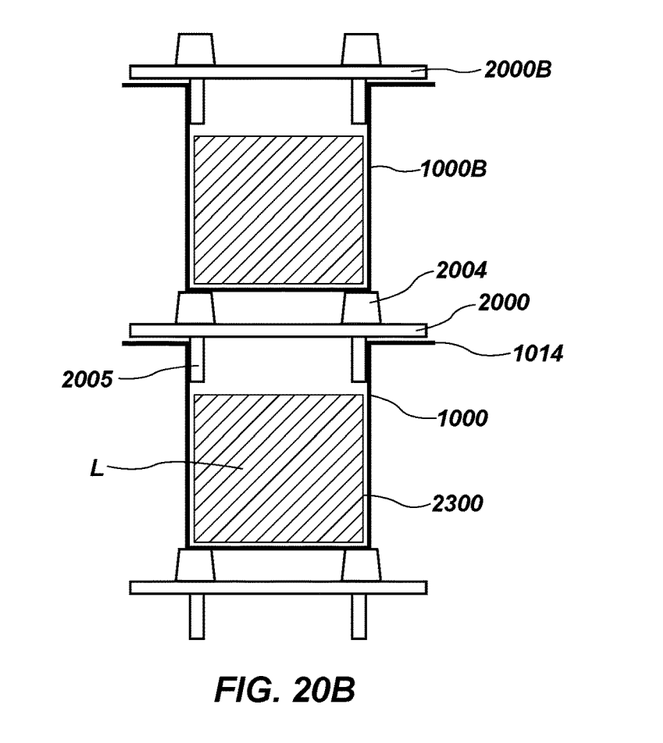

Turning to FIGS. 19, 20A and 20B, the use of a system including forms 1000 and stacker plates 2000 to form ice blocks is depicted. As shown in FIG. 19, a plastic liner 2300, such as a plastic bag, may be placed in the form 1000 through the open top 1100 and spread out to the corners along the bottom and sidewalls. The liner 2300 may be spread over the flanges. A liquid L to be frozen may then be placed in the form, contained in the liner and filling the form 1000 to an appropriate depth. The top of the liner may then be gathered, and where desired, closed to isolate the liquid L.

A stacker plate 2000 may be used to cover the open top 1000 of the ice block form 2000. The stacker plate 2000 resides on the flanges and the alignment member 2003 extend into the open top and retain the stacker plate in position thereon.

As depicted best in FIG. 20B, the stacker plate 2000 defines an insulative space 2350 above the liquid in the form 1000 between the upper surface of the liquid and the lower surface of the stacker plate due to the air in such space that is isolated from the surrounding freezer. This space results leads to the production of a desirable dense ice structure by encouraging the liquid L to freeze in a "bottom up" manner with the final stages of freezing more likely to occur near the upper surface to avoid trapping unfrozen liquid in the center of the block during freezing, leading to creaking and an unstable structure.

In embodiments sized as discussed above, the insulative space may have a depth of from about ½ to about 1 inch. It will be appreciated that this size may be adjusted as the size of the system varies in order to maintain an appropriate ratio.

A second ice form 1000B may then be placed over the stacker plate residing on the elevation members 2004 to provide a flow space 2352 therebetween while also supporting the base 1006 of the second ice block form 1000. The flow space 2350 is open to the environment around the forms 1000 and 100A and allows the movement of air in the freezer where the forms are placed to underneath the upper form. This encourages the initiation of freezing the liquid L through the conductive bottom 1006 of the form 1000A towards the top insulative space 2350 at the top of the form in a freezer in which they are placed to result in a dense ice block of relatively uniform structure.

It will be appreciated that the uppermost ice block form 1000 in a set of stacked forms may have a stacker plate 2000 placed thereover to provide the insulative space. Additionally, where desirable for a particular commercial or residential style freezer where the system is used, a stacker plate 2000 may be placed underneath the lowest form 1000 in the stack to provide a flow space 2352 underneath for uniform freezing in comparison to the forms stacked thereon. Additionally, it will be appreciated that the number of forms 1000 and stacker plates used in a particular stack may vary based on the size of the freezer where it is used. For example, where a commercial chest freezer would accommodate a stack of three or four ice block forms 1000 and associated stacker plates 2000, that number of assemblies may be stacked. Parallel stacks of the systems next to one another in such a freezer may also be utilized to maximize space.

It will be appreciated that methods of making ice blocks using the systems and components discussed herein and including steps such as placing a liner in a form, filling the liner in the form with a desired liquid, pulling the filled liner taut to remove wrinkles therein to achieve a smoother sider block, placing stacker plates and form in a freezer to obtain proper insulative and flow spaces, freezing the liquid, and/or removing ice blocks from the forms using the expansion joints to flex the form sidewalls to facilitate removal are included within the teachings of this disclosure.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

It should be noted that embodiments shown in the figures and described herein are intended to be exemplary and that any variations in the size and the relative proportions of the individual components fall within the scope of this disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A system comprising:
an ice block form comprising:
a generally planar base,
a plurality of sidewalls and rising from the generally planar base to define an open top,
at least one expansion joint formed as a gap between two members of the plurality of sidewalls, the at least one expansion joint extending from the generally planar base to the open top and allowing flexible movement between the two members of the plurality of sidewalls, and
a plurality of flanges, wherein each flange is disposed at an upper end of each sidewall of the plurality of sidewalls; and
a planar member comprising a first and second surface, wherein the first surface comprises a plurality of elevation structures and the second surface comprises a plurality of alignment structures;
wherein the planar member is configured to reside on the plurality of flanges of the ice block form and the plurality of alignment structures extend into the opening of the ice block form such that the planar member retains its position on the ice block form.

2. The system of claim 1, wherein the at least one expansion joint of the ice block form is formed between the two members of the plurality of sidewalls at a corner of the form.

3. The system of claim 1, wherein at least two of the plurality of flanges disposed at the upper end of each sidewall of the plurality of side walls are disposed at a same corner of the form.

4. The system of claim 1, wherein the ice block form further comprises a break formed between at least two of the plurality of flanges at a position corresponding to the at least one expansion joint between the sidewalls disposed at the same corner of the form.

5. The system of claim 1, wherein the plurality of flanges disposed at the upper end of the plurality of sidewalls extends along a generally common plane.

6. The system of claim 1, further comprising a plastic liner disposed within the open top created by the positioning of the plurality of sidewalls, and wherein the plastic liner is spread over the plurality of flanges.

7. The system of claim 1, wherein the plurality of sidewalls are flexible, and wherein the at least one expansion joint permits at least two of the plurality of sidewalls to flex independently of one another.

8. The system of claim 1, wherein the at least one expansion joint of the ice block form comprises at least two expansion joints.

9. The system of claim 1, wherein the at least one expansion joint comprises four expansion joints.

10. The system of claim 1, wherein each sidewall is attached to the generally planar base.

11. The system of claim 1, further comprising at least a second ice block form comprising:
a second generally planar base,
a second plurality of sidewalls and rising from the second generally planar base to define a second open top, and
a second set of expansion joints formed as gaps between sidewalls at corners of the second form.

12. The system of claim 11, wherein the plurality of elevation structures disposed on the first surface of the planar member are positioned to reside under the second generally planar base and support the second ice block form above the first ice block form when the planar member is placed over the open top of the first ice block form and supported on the plurality of flanges.

13. A system comprising:
an ice block form comprising:
a generally planar base,
a plurality of sidewalls, and
a plurality of flanges disposed at upper ends of the plurality of sidewalls;
a planar member sized to support the ice block form or cover an opening of the ice block form, comprising a first and second surface;
wherein the first surface comprises a plurality of elevation structures; and wherein the second surface comprises a plurality of alignment structures;
wherein the planar member is configured to reside on the plurality of flanges of the ice block form and the plurality of alignment structures extend into the opening of the ice block form such that the planar member retains its position on the ice block form.

14. The system of claim 13, wherein the plurality of elevation structures are columnar bodies.

15. The system of claim 13, wherein the plurality of elevation structures and the plurality of alignment structures are weight-bearing.

16. The system of claim 13, wherein the plurality of alignment structures are positioned to correspond to an opening of the ice block form.

17. The system of claim 13, wherein the plurality of alignment structures are positioned to correspond to the elevation structures.

18. The system of claim 13, further comprising at least a second planar member comprising:
a second planar member first surface and a second planar member second surface;
wherein the second planar member first surface further comprises a plurality of elevation structures; and
wherein the second planar member second surface further comprises a plurality of alignment structures.

19. The system of claim 18, wherein the plurality of elevation structures disposed on the second planar member first surface of the second planar member are positioned to form a first flow space above the ice block form, and wherein the plurality of alignment structures of the planar member are positioned to form a second flow space below the ice block form.

* * * * *